Fig. I

Dec. 21, 1965    P. J. KROON    3,224,110
ROTARY CYLINDER DRYER
Original Filed Jan. 25, 1961    3 Sheets-Sheet 2

INVENTOR.
PIETER J. KROON
BY
ATTORNEY

Dec. 21, 1965  P. J. KROON  3,224,110
ROTARY CYLINDER DRYER

Original Filed Jan. 25, 1961  3 Sheets-Sheet 3

INVENTOR.
PIETER J. KROON
BY
ATTORNEY

United States Patent Office 3,224,110
Patented Dec. 21, 1965

3,224,110
ROTARY CYLINDER DRYER
Pieter J. Kroon, Swarthmore, Pa., assignor to Scott Paper Company, Philadelphia, Pa., a corporation of Pennsylvania
Original application Jan. 25, 1961, Ser. No. 84,833, now Patent No. 3,169,050, dated Feb. 9, 1965. Divided and this application June 3, 1964, Ser. No. 372,345
6 Claims. (Cl. 34—124)

This is a division of application Serial No. 84,833, filed January 25, 1961, now Patent No. 3,169,050.

This invention relates to rotary cylinder dryers and particularly to paper machine dryers, commonly referred to as "Yankee" dryers.

Traditionally, the large (up to 10 to 12 feet in diameter) Yankee dryers used in paper machines have been made from cast iron or a mixture of cast iron and steel. Recently, attempts have been made to improve the performance of such dryers by making the outer shell, which provides the paper contacting surface, of metals having higher heat conductivity than cast iron (aluminum bronze for example) so that heat is transferred more readily from the heat transfer fluid within the dryer shell out to the paper web.

It is an object of this invention to improve the performance and reliability of rotary cylinder dryers through a novel concept of dryer construction particularly useful for dryers having outer shells constructed of high conductivity material. The most immediate advantage achieved as a result of utilizing the construction of this invention is that the dryer is capable of drying the paper web more rapidly, and the paper machine with which the dryer is associated can be run at a higher speed thereby improving its output of paper.

In prior dryer designs, full advantage could not be taken of the heat conducting capabilities of shell materials because the structures were such as to limit the maximum temperatures and pressures to which the dryer could be subjected with safety. Of particular significance in limiting operating temperatures and pressures were the auxiliary stresses to which the dryer shell and the end wall structure were subjected by virtue of thermal expansion and contraction of the dryer components when the dryer was heated and while it was in use.

It is another object of this invention to minimize the effects of thermal expansion and contraction of the dryer components and to minimize or substantially eliminate the generation of stresses within the dryer components as a result of such expansion and contraction.

Achievement of this objective is facilitated by rendering independent the heating function of the dryer shell and the supporting function of the major support components of the dryer, such as the trunnions and the end wall structure supporting the shell on the trunnions. In accordance with this invention, heating fluid is conveyed through the dryer structure in heat transfer relationship with only the shell structure and not in heat transfer relationship with the support components, or supporting structure, of the dryer. Therefore, the support components are not called upon to contain the heating fluid passing through the dryer and remain relatively cool during operation of the dryer, thereby substantially eliminating many of the problems encountered in prior dryers with respect to operating and thermal stresses in the support components. It thus becomes possible to simplify the design of the support components of the dryer and minimize their cost through the use of relatively inexpensive materials.

Substantial improvements in dryer performance and reliability have been achieved in recent years through the use of a double-wall type shell construction in which the heat transfer fluid (steam, oil or other heated fluid) is confined to flow through an annular heating chamber between co-axial shells. The basic concepts of this invention are readily applicable to dryers employing the double wall shell because steam, or other heating fluid, is constrained to flow through but a relatively small portion of the total internal volume of the dryer, mainly within a thin annulus beneath the outer shell, and is therefore readily isolated from the supporting structure of the dryer. Further in accordance with this invention, the inner and outer shells, that is the two walls defining the heating chamber, are united at their ends by novel sealing means which insures reliable retention of heating fluid flowing through the dryer.

It is another object of this invention to improve the heating fluid flow pattern in a double-wall type Yankee dryer. Particularly, this invention is concerned with achieving uniformity of flow of heating fluid over the inner surface of the dryer outer shell and, in a steam heated dryer, of effecting uniform and efficient removal of steam condensate; both of which features determine the uniformity with which the dryer is capable of heating and drying a paper web in contact with its outer surface.

It has long been recognized that non-uniformity of temperature of the paper contacting surface of a dryer does result in unsatisfactory drying of the paper web. So-called "hot spots" may be produced by the impingement of steam on a limited area of the dryer shell. Similarly, the accumulation of condensate on limited areas of the shell inner surface results in a reduction in temperature of the shell in those areas. Accumulation of large quantities of condensate is objectionable because it reduces the overall performance of the dryer and may unbalance the rotating system.

This invention provides a novel system of supply and removal nozzles for conveying steam to and from the annular heating chamber. The supply nozzles introduce steam at numerous, uniformly spaced locations to distribute the incoming steam throughout the heating chamber. The supply nozzles are constructed in such a manner as to cause the entering steam to sweep rapidly across the inner surface of the dryer shell, thereby insuring good heat transfer between the steam and the shell. The removal nozzles, which are also numerous and uniformly spaced around the dryer periphery, occupy positions intermediate the supply nozzles to receive spent steam and condensate which is swept toward the removal nozzles by the action of live steam entering the heating chamber. A novel supply conduit and header system provides for the flow of steam to and from the heating chamber in such a manner as to offer minimum resistance to expansion and contraction of the dryer shells.

Another feature of the invention concerns an improved construction for the removal nozzles of a steam heated Yankee dryer by which the nozzles are effective to accept and remove condensate from the inner surface of the dryer shell even when the shell undergoes extensive flexure, as when the shell is heavily loaded by a pressure roll or rolls running against its outer surface. A further feature of the invention resides in an improved mounting arrangement for the supply and removal nozzles which renders these nozzles accessible and removable without dismantling the dryer. This arrangement permits periodic inspection and replacement of worn or defective nozzles with minimum loss of operating time.

Other objects, advantages and features of the invention will be apparent from the following detailed description thereof wherein reference is made to the accompanying drawings in which.

Figure 1:
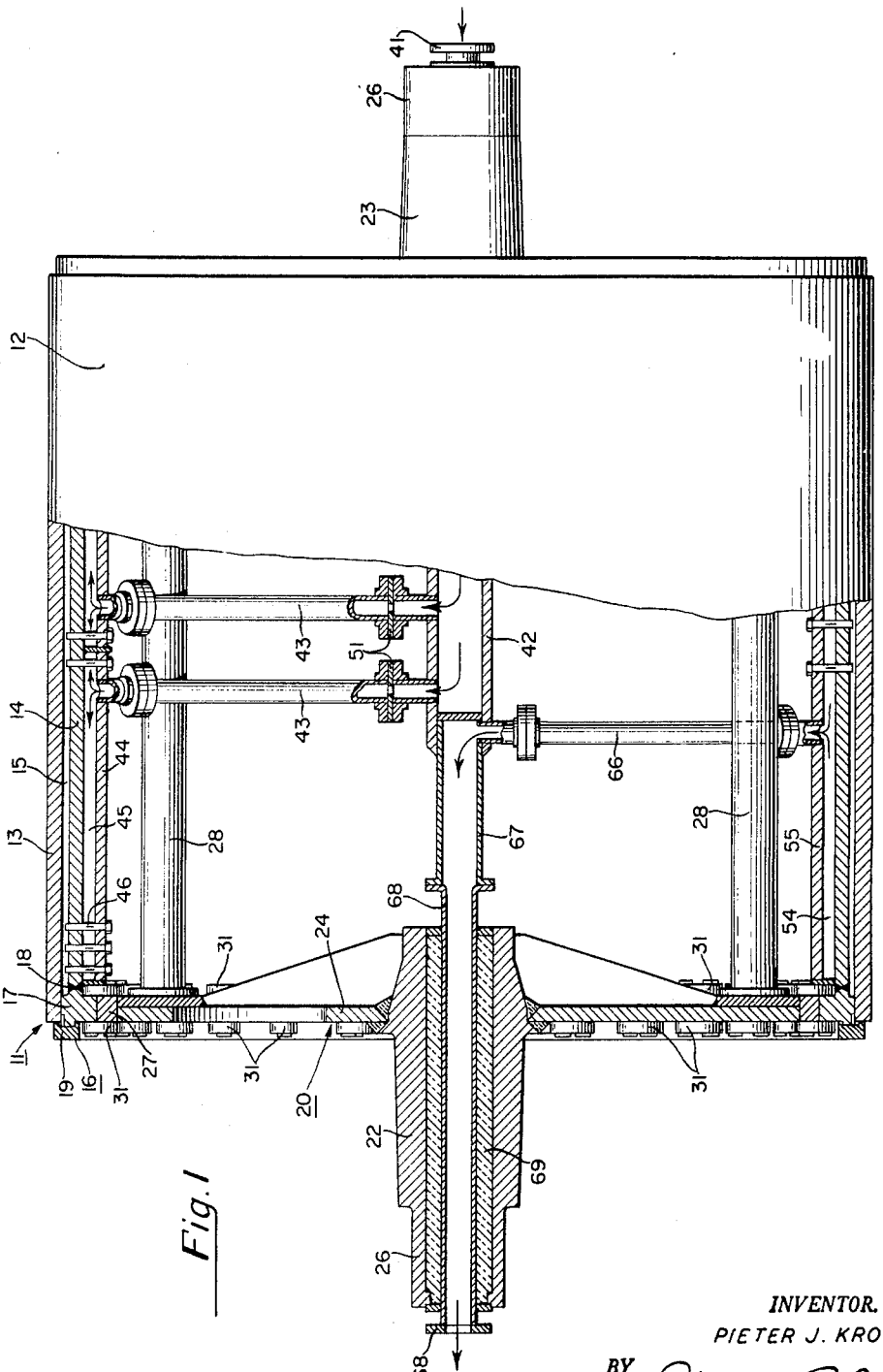
FIGURE 1 is an elevational view, partially in section, of a paper machine dryer embodying this invention.

Referring particularly to FIGURE 1, the dryer of this invention includes a heated shell structure 11 having a cylindrical paper contacting surface 12. The shell structure 11 includes an outer cylindrical shell 13, which preferably is fabricated from aluminum bronze or other metal having good heat conducting characteristics. The shell structure also includes an inner cylindrical shell 14 which is co-axially arranged within outer shell 13. Inner shell 14 is spaced from outer shell 13 by a small amount to provide a thin annular heating chamber 15 between the shells for the reception of a suitable heating fluid, such as steam. The ends of inner and outer shells 13 and 14 are united in fluid-tight relationship by rim means, indicated generally at 16, comprising two flange-like rim rings 17 which are welded, as indicated at 18, or otherwise secured to the ends of the inner shell 14. Also forming parts of rim means 16 are clamping rings 19 which are secured, respectively, to rim rings 17 and outer shell 13 by means of screws 21 (see enlarged detail in FIGURE 4).

Shell structure 11 is supported for rotary movement about the axis of its shells 13 and 14 by means of a supporting structure, indicated generally by numeral 20, comprising oppositely extending trunnions 22 and 23 and radially extending end walls, or webs, 24 which are welded or otherwise secured to trunnions 22 and 23. Trunnions 22 and 23 have journals 26 thereon which are adapted to be received in suitable bearings (not shown) in which the dryer turns. Suitable driving means (also not shown) may be provided for turning the dryer. The periphery of each web 24 of the supporting structure is preferably reinforced by means of a ring 27 having a somewhat greater thickness than the sheet material from which the webs 24 are formed. The entire supporting structure, including trunnions 22 and 23, webs 24 and rings 27 may be cast in one or more pieces.

This supporting structure may be further reinforced by including longitudinally extending torque tubes 28. The tubes 28 are preferably bolted or otherwise affixed at their ends to inner wall portions of webs 24 and serve to stiffen, or rigidize, the supporting structure.

This invention contemplates that the supporting structure, i.e., the end webs 24, their reinforcing rings 27 and the trunnions 22 and 23, may be formed from carbon steel, cast steel, or other metal which is inexpensive by comparison to the high conductivity metal from which the dryer outer shell 13 is preferably made. In addition, as will be apparent from other portions of this description, the supporting structure 20 is not required to contain heating fluid circulated through the dryer, is not heated to any substantial extent by such fluid and, consequently, may be relatively light construction as compared to earlier dryers.

When heating fluid is introduced into heating chamber 15 dryer shells 13 and 14 undergo thermal expansion, the most noticeable effect being experienced in circumferential and longitudinal directions. As can be readily appreciated, any significant increase in the circumferential dimensions of shells 13 and 14 must result in a proportionate increase in the diameter of shell structure 11. The supporting structure 20 for shell structure 11 does not undergo like thermal expansion because, as mentioned previously, it is of relatively rigid construction and the several components thereof are preferably fabricated from materials having different thermal expansion characteristics than the materials used in shells 13 and 14. In addition, webs 24 and their reinforcing rings 27 are not contacted by the heating fluid in shell structure 11 and, consequently, are not heated to the same extent as is the shell structure.

It should be apparent, therefore, that a serious problem exists with respect to connecting the expanding and contracting shell structure 11 to its relatively rigid supporting structure 20. Directly and rigidly connecting these two assemblies of the dryer would result in warping or distortion of the supporting structure and the shell structure. Such distortions of the shell structure cannot be tolerated because the stresses which are likely to be induced therein could cause failure of the shell.

Shell structure 11 is connected to its supporting structure by means of a novel connecting arrangement which permits the shell structure to float on the supporting structure, so far as expansion and contraction of the shell structure are concerned, but which maintains a positive driving connection between the shell structure and its supporting structure and maintains concentricity of the shell structure.

Figure 2:
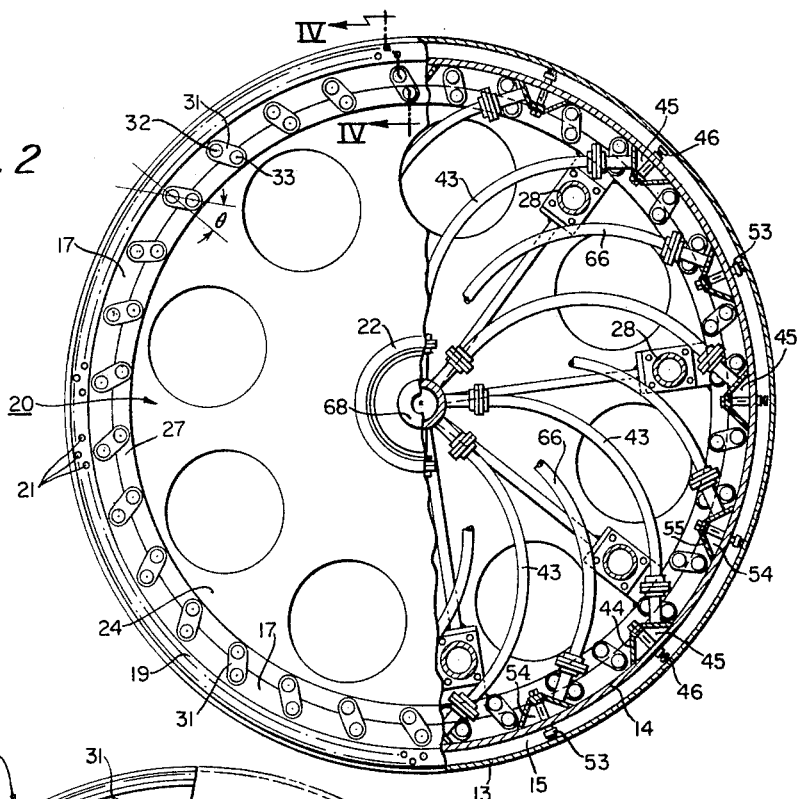
FIGURE 2 is an end view, partially in section, of the dryer of FIGURE 1.
Figure 4:
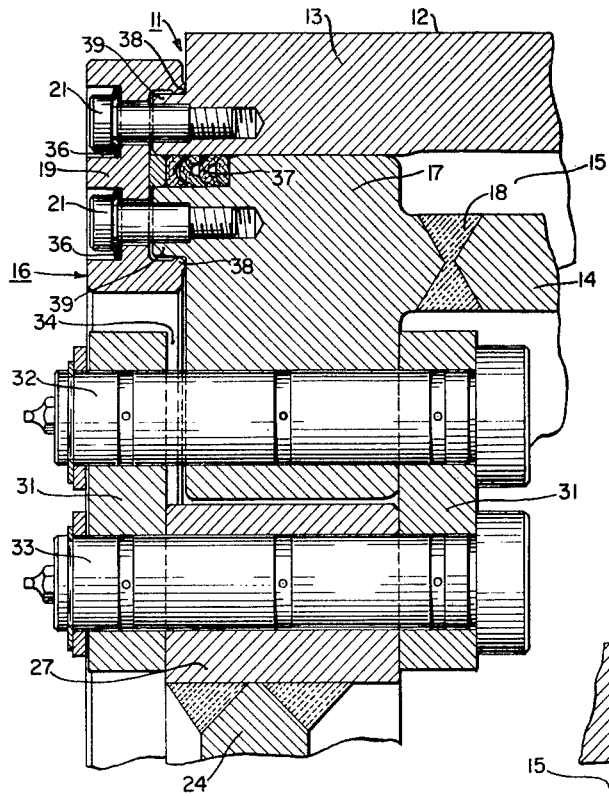
FIGURE 4 is an enlarged, fragmentary sectional view through a portion of the dryer shell taken generally as indicated by line IV—IV in FIGURE 2.

This novel connecting arrangement include a multiplicity of connecting links 31, disposed at each end of the dryer shell strcture and having their ends pivotally connected, respectively, to the shell rim means 16 and the reinforcing rings 27 of the supporting structure. The connecting arrangement at one end of the dryer is substantially the same as that at the other end of the dryer and therefore but one end is shown and described in detail. Referring particularly to FIGURES 2 and 4, the pivotal connections between links 31 and rim means 16 are preferably provided by pins 32 passing through an inner flange portion of rim ring 17. The pins 32 are preferably equally spaced along the circumferential extent of each ring 17 and located equidistantly from the axis of rotation of the dryer. The inner pivotal connections for links 31 are preferably provided by similar pins 33 passing through openings provided therefor in reinforcing ring 27, which pins also are equidistantly spaced from the axis of rotation of the dryer.

FIGURE 2 illustrates the relative positioning of the components of the dryer when it is in an unheated, or cool, condition. It will be noted that the inner pivot pin 33 of each link 31 is offset circumferentially from the outer pivot pin 32 for the link. In other words, the longitudinal center line of each link 31 is oblique with respect to a radial line passing therethrough from the axis of rotation of the dryer. The angle of obliquity in the unheated dryer is identified in FIGURE 2 as angle Theta, which may be of the order of 30°, as shown. It will also be noted that the inner periphery, or bore, of rim 17, forming a part of the shell structure, is in close proximity to the outer periphery of reinforcing ring 27 of the supporting structure when the dryer shell structure 11 is unheated (see FIGURES 2 and 4). In fact, the dryer assembly may be designed in such a manner that rings 17 and 27 are actually in contact when the dryer is not heated.

Figure 3:
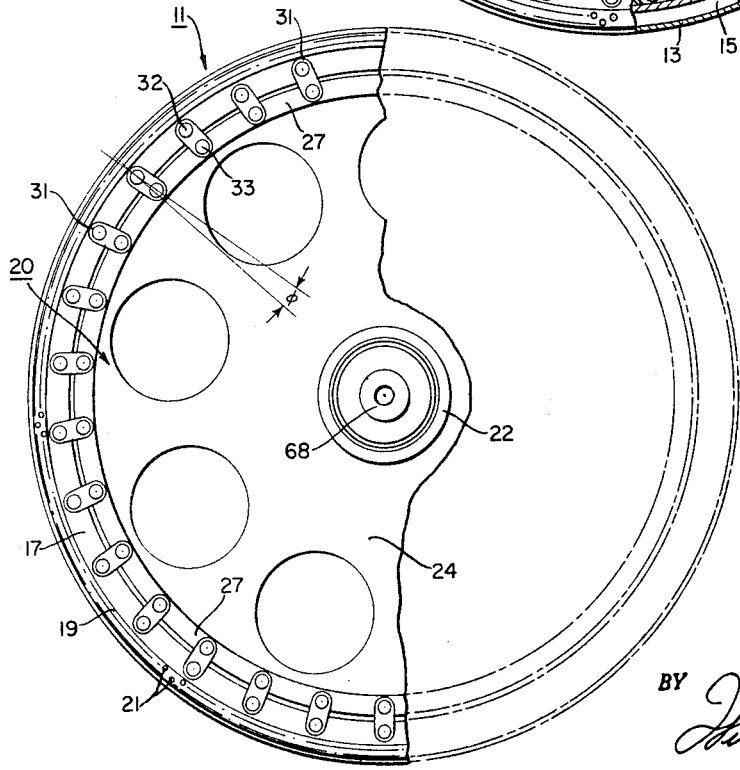
FIGURE 3 is a fragmentary end view of the dryer showing the relationship of the components thereof when the dryer is in a heated condition.

The effect created by heat being applied to shell structure 11, with resultant radial expansion of that structure, is illustrated in FIGURE 3 from which it will be noted that every incremental portion of the shell structure 11 has moved away from the reinforcing ring 27 of the supporting structure. This relative movement of the shell structure 11 with respect to the supporting structure of the dryer is permitted and controlled by the links 31 connecting these two assemblies. It will be noted that movement of the shell structure 11 with respect to ring 27 is permitted by virtue of each link 31 swinging on its pivot pins 32 and 33, consequently, the angle between the centerline of each link 31 and a radius passing therethrough decreases to a lesser value (note angle phi in FIGURE 3). The links 31 are both numerous and closely spaced so that the dryer shell structure 11 is effectively connected, or linked, throughout its periphery to ring 27 of the supporting structure. Concentricity of the shell structure is thereby maintained, although a pressure roll or rolls used in conjunction with the dryer and which press against limited areas of the dryer surface 12 may deflect limited regions of the outer shell 13.

Two sets of links 31 are preferably employed at each end of the dryer shell and arranged as shown in FIGURE 4 with one set of links being disposed to the outside of reinforcing ring 27 and another set of links disposed adjacent the inside surface of ring 27. It is also desirable that provision be made for longitudinal expansion and contraction of the shell structure 11 independently of the cooler supporting structure 20. This is preferably achieved by making rim ring 17 of less thickness than reinforcing ring 27 so that a clearance space, indicated at 34 in FIGURE 4, is provided between the outer surface of rim ring 17 and the inner surface of the outer set of links 31. This permits rim ring 17 to slide outwardly on pivot pins 32 upon longitudinal expansion of the dryer shells 13 and 14 without stressing and distorting supporting structure 20. Clearance space 34 is preferably provided at but one end of the dryer in order that the shell structure 11 may be restrained against longitudinal shifting on the supporting structure during operation of the dryer.

It will be noted that the connecting arrangements comprising links 31 and pins 32 and 33 are not called upon to perform any sealing function so far as heating chamber 15 of shell structure 11 is concerned. This is considered to be a substantial improvement over certain prior dryer designs in which flexible joints, or connections, between the dryer shells and the supporting structure were also called upon to retain heating fluid within the confines of the dryer.

A fluid-tight connection must, of course, be provided between the inner shell 14 and the outer shell 13 and some provision should be made for differential expansion and contraction of the two shells. The problem of differential expansion and contraction of shells 13 and 14 can be alleviated to a certain extent by constructing the shells of like materials or of different materials having approximately the same coefficient of thermal expansion. In a dryer utilizing aluminum bronze as the outer shell material, the inner shell is preferably made from stainless steel because this material has a coefficient of thermal expansion closely approximating that of aluminum bronze and offers the additional advantage of high strength. Stainless steel conducts heat more poorly than aluminum bronze and this too is a beneficial characteristic inasmuch as the relative insulating effect of the stainless steel inner shell assists in retaining heat in chamber 15 for transmission through the outer shell 13 to the paper contacting surface 12.

Constructing inner and outer shells, 13 and 14, of materials having similar coefficients of expansion does not, however, eliminate the problem of differential expansion and contraction of the two shells. Both shells may expand, i.e., elongate, by the same amount as the dryer is brought up to operating temperature. But the outer shell 14 cools and contracts upon being contacted by a wet paper web. Therefore, in order to eliminate any possibility of distortion of outer shell 13 as a result of differential expansion and contraction of the inner and outer shells, 14 and 13, it is desirable that some provision be made for permitting relative movement of these members. Such provision is incorporated in the dryer of this invention by employing a novel construction for clamping rings 19 which secure the ends of the outer shell 13 to rim rings 17. This construction is illustrated in FIGURE 4 from which it is to be noted that each clamping rim 19 (only one being shown) is C-shaped in cross-section to embrace ring-like projections 39 on outer shell 13 and rim ring 17. Spring-type washers 36 compressed beneath the heads of screws 21 bias clamping ring 19 against the end of outer shell 13 and against rim ring 17 and permit ring 19 to tilt as relative longitudinal movement takes place between shells 13 and 14. This tilting action is facilitated by bearing projections 38 provided on each ring 19 and which engage outer shell 13 and rim ring 17.

Clamping ring 19 in turn bears against a packing assembly 37 which seals the joint between rim ring 17 and outer shell 13 and prevents heating fluid from escaping through that joint. Repair and replacement of packing assembly 37 is easily accomplished because access thereto may be had by removal of screws 21 and clamping ring 19 without dismantling other portions of the dryer.

The improved floating-type connecting arrangement for the dryer shell structure 11 may be used in dryers employing various systems for heating the dryer outer shell. The steam-heated dryer, however is the one most commonly used in the papermaking industry today and this invention contemplates an improved system for conveying steam to and removing steam and condensate from the heating chamber 15 of a shell structure which is supported for unrestricted expansion and contraction.

In accordance with the invention, steam is introduced to the dryer by means of an inlet pipe 41 passing through trunnion 23 and communicating with a supply manifold 42 axially disposed in the dryer interior (see FIGURE 1). Communicating with manifold 42 are a plurality of curved supply conduits 43 which extend outwardly from and circumferentially of the manifold and communicate at their outer ends with a plurality of supply headers 44 on the inner surface of inner shell 14 (see FIGURE 12). The curvature of supply conduits 43 lends flexibility to these conduits so that they are not unduly stressed by expansion and contraction of the dryer shell structure 11 under changing temperature conditions.

Figure 5:
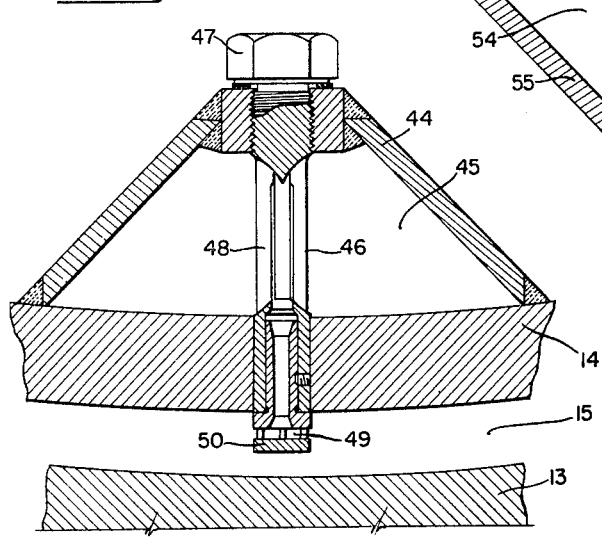
FIGURE 5 is an enlarged, fragmentary sectional view through a steam supply header of the dryer.

The several steam supply headers 44 are preferably welded or othewise affixed to the inner shell 14 and arranged to provide longitudinally extending header passages 45 at spaced intervals around the interior of the shell. Steam is distributed from each of the header passages 45 into a plurality of regions of the heating chamber 15 by means of supply nozzles 46 extending through aligned openings in each header 44 and the inner shell 14. Each nozzle 46, as shown in FIGURE 5, is preferably threadably received in or otherwise secured in its header 44 and provided with a suitable manually manipulatable portion 47 which is accessible interiorly of the dryer, so that the nozzles may be removed for inspection and replacement without the necessity for dismantling dryer shell structure 11 or headers 44.

Each supply nozzle 46 receives steam from its header passage 45 through inlet ports 48 and discharges this steam through outlet ports 49 in a radiating pattern, generally tangential to the inner surface of the outer shell 13. The outer end of each nozzle 46 is preferably closed by a baffle plate 50 which prevents steam impinging directly on the inner surface of the outer shell. The construction of the nozzles 46 is such as to distribute the incoming steam in a substantially uniform pattern over the entire inner surface of the dryer outer shell to avoid overheating any one region of the outer shell.

The resistance to steam flow offered by supply nozzles 46 tends to distribute the steam flow uniformly throughout the several supply nozzles. To additionally insure equal distribution of steam to the several supply headers 44, it may be desirable to insert a number of identical, flow controlling orifice plates 51 in the several supply conduits 43 communicating with the supply headers. Each supply conduit 43 is preferably equipped with an orifice plate 51 in a fitting near the inlet end thereof, as shown in FIGURE 1. These orifice plates 51 tend to minimize the effects of differences in steam pressure along manifold 42 and the differences in resistance to fluid flow offered by the various conduits. Uniform distribution of steam to all circumferential regions of heating chamber 15 is thereby assured.

Removal of steam and such condensate as may be formed is performed by a system commonly referred to as a "blow through" removal system, but the system of this invention possesses a number of features and advantages not present in prior systems of this type.

The removal system of this invention includes a plurality of removal nozzles 53 communicating with heating chamber 15 and arranged in a plurality of spaced, longitudinally extending rows in a manner to pass through and communicate with a plurality of longitudinally extending removal header passages 54 provided by removal headers 55. Like certain prior removal nozzles, the outermost, or intake, end 56 of each removal nozzle 53 has a plurality of restricted inlet ports 57 disposed in close proximity to the inner surface of the dryer outer shell 13. In operation, steam entering ports 57 of the removal nozzles 53 is constricted in its flow path and the resultant high velocity achieved enables the steam flow to carry along condensate liquid present on the inner surface of the outer shell 13 in the immediate vicinity of the intake ports. As can best be appreciated from FIGURE 2, rows of inlet nozzles 48 and removal nozzles 53 are alternately disposed around the circumferential extent of heating chamber 15. A multiplicity of nozzles of both types are employed and the spacing of nozzles of different types is relatively small, of the order of 10 to 30 inches, so that steam issuing from inlet nozzles 46 is effective to sweep condensate across the inner surface of shell 13 toward the several removal nozzles 53. By this arrangement, the entire inner surface of the outer shell 13 is continuously swept substantially clear of condensate, thereby preventing accumulation of sufficient condensate to interfere with the transfer of heat from the heating fluid to the outer shell 13. It also follows that large accumulations of condensate, which might unbalance the dryer, are precluded from forming. An improvement in the rate of transfer of heat from the steam to the outer shell 13 is also realized as a result of the sweeping action, or rapid movement, of the steam over the inner surface of shell 13.

Figure 6:
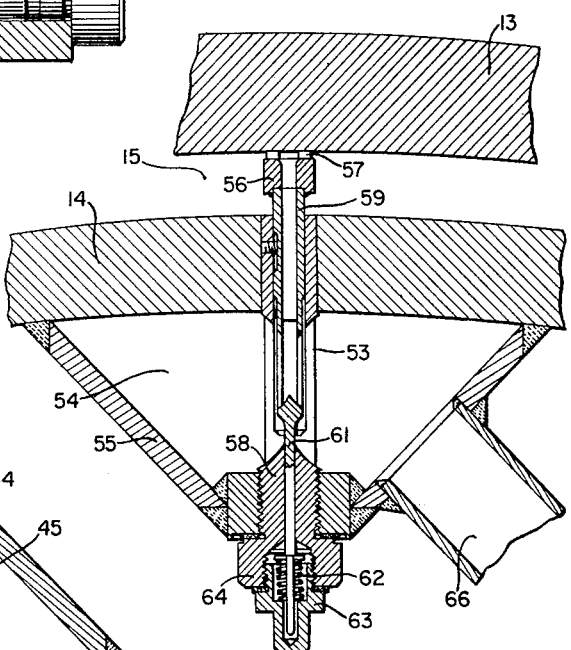
FIGURE 6 is an enlarged sectional view through a steam removal header of the dryer.

Clearly, for continued efficient operation, the intake ports 57 of removal nozzles 53 must, within certain limits, retain their desired configurations and dimensions. It has been observed in prior steam heated dryers utilizing the blow through principle of steam removal that the removal nozzles become worn as the result of repeated flexure of the dryer outer shell under the action of press rolls running thereon. In such dryers it has been the practice to mount the removal nozzles in stationary fashion. Consequently, there is relative movement between the outer shell and the removal nozzles which promotes wear of the outer ends of these nozzles. In order to relieve this condition the removal nozzles 53 of this invention are constructed in such a manner that the outer, or intake, ends 56 thereof are movable with respect to a body or mounting portion 58 thereof. As shown in FIGURE 6, the outer end 56 of the nozzle may be secured to a movable sleeve 59 having a rod 61 connected to its inner end, which rod, in turn, engages one end of a compression spring 62 carried in a cap 63 threaded into the inner end 64 of the nozzle. Spring 62 is effective to bias the outer end 56 of removal nozzle 53 into engagement with the inner surface of the outer shell, yet permit yielding movement of this end of the removal nozzle as the shell is deflected. Such yielding movement of the intake end of nozzle 53 is effective to substantially reduce wear of the removal nozzle.

Each removal nozzle 53, like the several supply nozzles 47, is preferably removably secured within its header 55, so that inspection and replacement thereof is possible without dismantling other portions of the dryer structure. Large openings in the webs 24 at each end of the dryer provide ready access to the interior of the dryer and to nozzles 46 and 53.

Steam and condensate entering the several removal headers 55 are removed therefrom by means of a plurality of removal conduits 66, which communicate with a removal manifold 67 axially disposed in the dryer interior. Removal conduits 66 are also curved in planes normal to the axis of the dryer as shown in FIGURE 2, in a manner like supply conduits 43, to impart flexibility to the removal conduits. As shown in FIGURE 1, removal manifold 67 is connected to a discharge pipe 68 which passes through trunnion 22 and serves as an exit means for spent steam and condensate leaving the dryer. It is desirable that inlet pipe 41 and discharge pipe 68, which pass through trunnions 23 and 22, respectively, be insulated therefrom by suitable heat insulation material, as indicated at 69 in FIGURE 1, in order to minimize the quantity of heat applied to the supporting structure 20 of the dryer. As mentioned previously, the other structural features of the dryer are such that very little heat is conducted to the supporting structure 20 from shell structure 11.

The advantageous features of a Yankee dryer constructed in accordance with this invention may be summarized as follows:

(1) Heat is applied only to those portions of the dryer where heat is actually required with the result that the supporting structure, particularly the end walls of the dryer remain relatively cool and warpage problems of the shell and the supporting structure normally associated with expansion and contraction of the end walls are virtually eliminated.

(2) Elimination of temperature and pressure induced distortion stresses in the end walls of the dryer simplifies the construction and reduces the cost of the dryer supporting structure.

(3) The novel system of multiple supply nozzles by which heating fluid is swept rapidly across the inner surface of the dryer shell improves the rate of heat transfer between the heating fluid and the shell.

(4) Effective removal of condensate is assured by a combination of steam sweeping action, promoted by the supply nozzles, and the flexibly mounted removal nozzles, which are constructed for long life and reliable operation.

(5) The overall design and arrangement is such as to contribute to ease of component repair and replacement.

(6) A minimum number of flexible seals are present in the heating fluid circuit, there being but one at each end of the shell structure.

What I claim is:

1. In a dryer of the rotary cylinder type, a cylindrical shell, wall means co-axial with said shell defining a heating chamber to which the inner surface of said shell is exposed, a plurality of spaced longitudinally extending rows of steam supply nozzles disposed in spaced relationship in said heating chamber, said nozzles being constructed and arranged to admit steam to said heating chamber in flow paths generally tangential to the inner surface of said shell, a plurality of spaced longitudinally extending rows of removal nozzles projecting into said heating chamber and having restricted intake ports disposed in close proximity only to the inner surfaces of said shell, said rows of removal nozzles being interspersed among said rows of supply nozzles and located substantially midway between adjacent rows of supply nozzles for receiving condensate swept across the inner surface of said shell by steam leaving said supply nozzles.

2. In a dryer of the rotary cylinder type, an outer cylindrical shell, wall means co-axial with said shell defining a chamber to which the inner surface of said shell is exposed, means for supplying steam to said chamber, a plurality of removal nozzles disposed about the inner surface of said shell and carried by said co-axial wall means for rotation with said shell, said nozzles being carried in a manner to permit movement of the nozzles with respect to said co-axial wall means, the outer end of each of said removal nozzles being constructed to provide restricted inlet ports to the nozzle, spring means biasing said outer ends of said nozzles away from said co-axial wall means and into engagement with the inner surface of said shell, and means for conveying away condensate and spent steam collected by said nozzles.

3. In a dryer of the rotary cylinder type, an outer cylindrical shell, an inner co-axial shell radially spaced from said outer shell so as to provide a chamber to which the inner surface of said outer shell is exposed, means for supplying steam to said chamber, a plurality of removal nozzles disposed about the inner surface of said outer shell and carried on said inner shell for rotation with said outer shell, said nozzles being adjustably mounted on said inner shell to permit movement of the nozzles with respect to said inner shell, the outer end of each of said removal nozzles being constructed to provide restricted inlet ports to the nozzles, spring means biasing said outer ends of said nozzles away from said inner shell and into engagement with the inner surface of said outer shell, and means for conveying away condensate and spent steam collected by said nozzles.

4. In a dryer of the rotary cylinder type, an outer cylindrical shell, an inner co-axial shell radially spaced from the outer shell to provide a chamber therebetween, structure for supporting said shells for rotation about the common axis, said supporting structure including a journal at each end of the dryer, means for admitting steam to said chamber and means for removing spent steam and condensate from said chamber comprising a plurality of removal header means carried on the inner surface of said inner shell, and individually removable nozzles extending through said header means and through said inner shell into said chamber in close proximity to the inner surface of said outer shell.

5. A dryer as specified in claim 4 in which the outer end portion of each nozzle is movable with respect to another portion thereof and includes means biasing said outer end portion into engagement with said outer shell.

6. In a dryer of the rotary cylinder type, an outer cylindrical shell, an inner co-axial shell radially spaced from the outer shell to provide therebetween a chamber for reception of a heating medium, means carried by said inner shell defining a plurality of circumferentially disposed and substantially equally spaced longitudinally extending header passages, alternate ones of said header passages serving respectively to supply steam to and convey condensate and spent steam from said chamber, nozzle means projecting into said chamber and providing multiple orifice communication between each of said passages and said chamber, the nozzle means for said removal passages having restricted intake ports in close proximity to the inner surface of said outer shell, the nozzle means for said supply passages having outlet ports adapted to direct steam outwardly over the contiguous surface of said outer shell, said chamber being otherwise substantially unobstructed to permit steam to flow radially outwardly from said supply nozzle means and flow radially inwardly to said removal nozzle means, whereby steam issuing from the supply nozzle means sweeps condensate along the inner surface of said outer shell toward adjacent removal nozzle means.

References Cited by the Examiner
UNITED STATES PATENTS

| | | | |
|---|---|---|---|
| 2,677,898 | 5/1954 | Ohlson et al. | 34—124 |
| 2,677,899 | 5/1954 | Ohlson et al. | 34—124 |
| 2,817,908 | 12/1957 | Hornbostel | 34—119 |
| 3,022,047 | 2/1962 | Swaney | 34—124 |

FOREIGN PATENTS 531,605 8/1931 Germany.

WILLIAM F. O'DEA, *Primary Examiner.*

NORMAN YUDKOFF, *Examiner.*

F. E. DRUMMOND, D. A. TAMBURRO,
*Assistant Examiners.*